(12) United States Patent
Chung

(10) Patent No.: US 11,445,705 B2
(45) Date of Patent: Sep. 20, 2022

(54) RETRACTABLE LEASH WITH IMPROVED LOCKING AND UNLOCKING MECHANISM

(71) Applicant: Wing Yin Chung, Kwun Tong (HK)

(72) Inventor: Wing Yin Chung, Kwun Tong (HK)

( * ) Notice: Subject to any disclaimer, the term of this patent is extended or adjusted under 35 U.S.C. 154(b) by 503 days.

(21) Appl. No.: 16/724,394

(22) Filed: Dec. 23, 2019

(65) Prior Publication Data

US 2020/0288674 A1 Sep. 17, 2020

(30) Foreign Application Priority Data

Mar. 12, 2019 (DE) ...................... 20 2019 101 402.4

(51) Int. Cl.
*A01K 27/00* (2006.01)
*B65H 75/44* (2006.01)

(52) U.S. Cl.
CPC ....... *A01K 27/004* (2013.01); *B65H 75/4442* (2013.01); *B65H 75/4471* (2013.01)

(58) Field of Classification Search
None
See application file for complete search history.

(56) References Cited

U.S. PATENT DOCUMENTS

| | | | | |
|---|---|---|---|---|
| 5,377,626 | A * | 1/1995 | Kilsby | A01K 27/004 119/796 |
| 7,036,459 | B1 * | 5/2006 | Mugford | A01K 27/004 242/405 |
| 8,904,969 | B2 * | 12/2014 | Chefetz | B65H 75/4444 119/796 |
| 10,420,327 | B2 * | 9/2019 | Zhu | A01K 27/004 |
| 10,829,341 | B2 * | 11/2020 | Lai | B65H 75/4431 |
| 2012/0137978 | A1 * | 6/2012 | McBounds | A01K 27/004 119/796 |
| 2016/0120152 | A1 * | 5/2016 | Zhu | A01K 27/004 119/796 |
| 2018/0027775 | A1 * | 2/2018 | Smith | A01K 27/004 |
| 2018/0288973 | A1 * | 10/2018 | Chen | A01K 27/004 |
| 2019/0350172 | A1 * | 11/2019 | Liu | A01K 27/004 |

* cited by examiner

*Primary Examiner* — William A. Rivera

(57) ABSTRACT

A retractable leash with improved locking and unlocking mechanism, having a housing; a spool disposed inside the housing and biased towards the winding direction; a braking means; a locking means rotatable between a locking position to stop rotation of the spool towards the unwinding direction and an unlocking position; a biasing means which biases the locking means towards the unlocking position; a press button pivotable between a pressed position and a released position; an actuating means rotatably engaged with the press button and the locking means between a default position and an actuating position; and a sliding button having an upper portion exposing on the upper portion of the press button and a lower portion extending downwards through the press button into the housing.

9 Claims, 4 Drawing Sheets

RETRACTABLE LEASH WITH IMPROVED LOCKING AND UNLOCKING MECHANISM

BACKGROUND OF THE INVENTION

The present invention relates to a retractable leash and more particularly pertains to a retractable leash with improved locking and unlocking mechanism.

Convention retractable leashes are equipped with leash stopping, locking and releasing functions. However, the buttons actuating the stopping, locking and releasing functions are often not conveniently provided on the leash housing, therefore reducing user comfort when using the leashes.

BRIEF SUMMARY OF THE INVENTION

In view of the aforesaid disadvantages now present in the prior art, the object of the present invention is to provide a retractable leash with improved locking and unlocking function which provides an integrated and convenient mechanism to stop, lock and release the leash.

To attain this, the present invention generally comprises:
a housing;
a spool disposed inside the housing and rotatable in either an unwinding direction or a winding direction and is biased towards the winding direction;
a braking means provided on the spool;
a locking means rotatable between a locking position where a first portion of the locking means engages with the spool and cooperates with the braking means to stop rotation of the spool towards the unwinding direction and an unlocking position where the locking means is disengaged from the spool and the spool is rotatable towards either the unwinding direction or the winding direction;
a biasing means which biases the locking means towards the unlocking position;
a press button with an upper portion thereof exposing outside the housing and pivotable between a pressed position and a released position;
an actuating means rotatably engaged with the press button and the locking means between a default position and an actuating position; a first actuating portion of the actuating means abuts against a bottom portion of the press button at the default position to maintain the press button at the released position; pressing of the press button from the released position to the pressed position rotates the actuating means from the default position to the actuating position where the locking means is pushed by a second actuating portion of the actuating means to overcome biasing force of the biasing means to rotate to the locking position;
a sliding button having an upper portion exposing on the upper portion of the press button and a lower portion extending downwards through the press button into the housing;
the lower portion of the sliding button is configured to slide along an L-shaped sliding track having a vertical portion and a horizontal portion in the housing between a first position where the lower portion of the sliding button is disengaged from the actuating means and a second position where the lower portion of the sliding button abuts against the first actuating portion of the actuating means to prevent rotation of the actuating means and thereby maintaining the actuating means at the actuating position.

The braking means on the spool is in form of ratchet teeth disposed at an outer perimeter of the spool; the spool has a top side and a bottom side which are both disposed with identical ratchet teeth at outer perimeters thereof.

The first portion of the locking means is in form of a clamp with a top extension and a bottom extension connected by a vertical member; the top extension and the bottom extension are adapted to extend into the outer perimeter of the top side and the bottom side of the spool respectively to cooperate with the ratchet teeth of the top side and the bottom side respectively at the locking position.

The actuating means has a cam shape having a first converging end and a second converging end along a lengthwise direction of the actuating means; the actuating means is rotatable along a rod passing through the first converging end.

The biasing means is in form of a torsion spring with an end of a first leg coupled to a rod fixed in the housing and an end of a second leg coupled to an inside of the locking means.

A first end of the press button is pivotally connected to a rod fixed in the housing.

The lower portion of the sliding button extending downwards from the press button has an acute-angled bottom end; a guiding member passes through the bottom end.

The guiding member is in form of a rod.

The sliding track comprises a first L-shaped frame, a second L-shaped frame, and a gap between the first L-shaped frame and the second L-shaped frame for the lower portion of the sliding button to pass through; the guiding member passing through the bottom end of the lower portion of the sliding button has a first end which is configured to slide within the first L-shaped frame and a second end which is configured to slide within the second L-shaped frame.

DETAILED DESCRIPTION OF THE INVENTION

Figure 1:
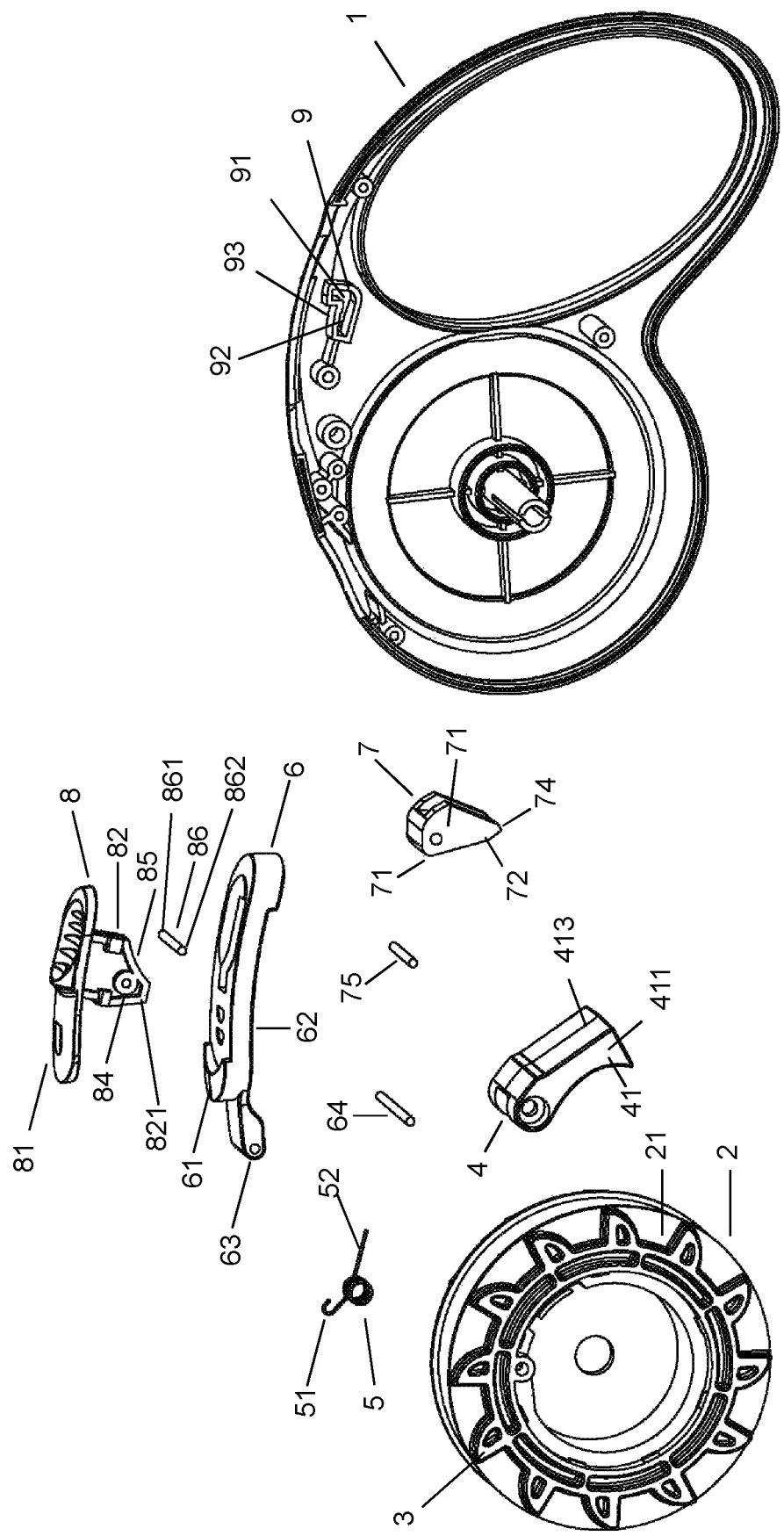
FIG. 1 is a first perspective disassembling view of a preferred embodiment of the present invention.
Figure 2:
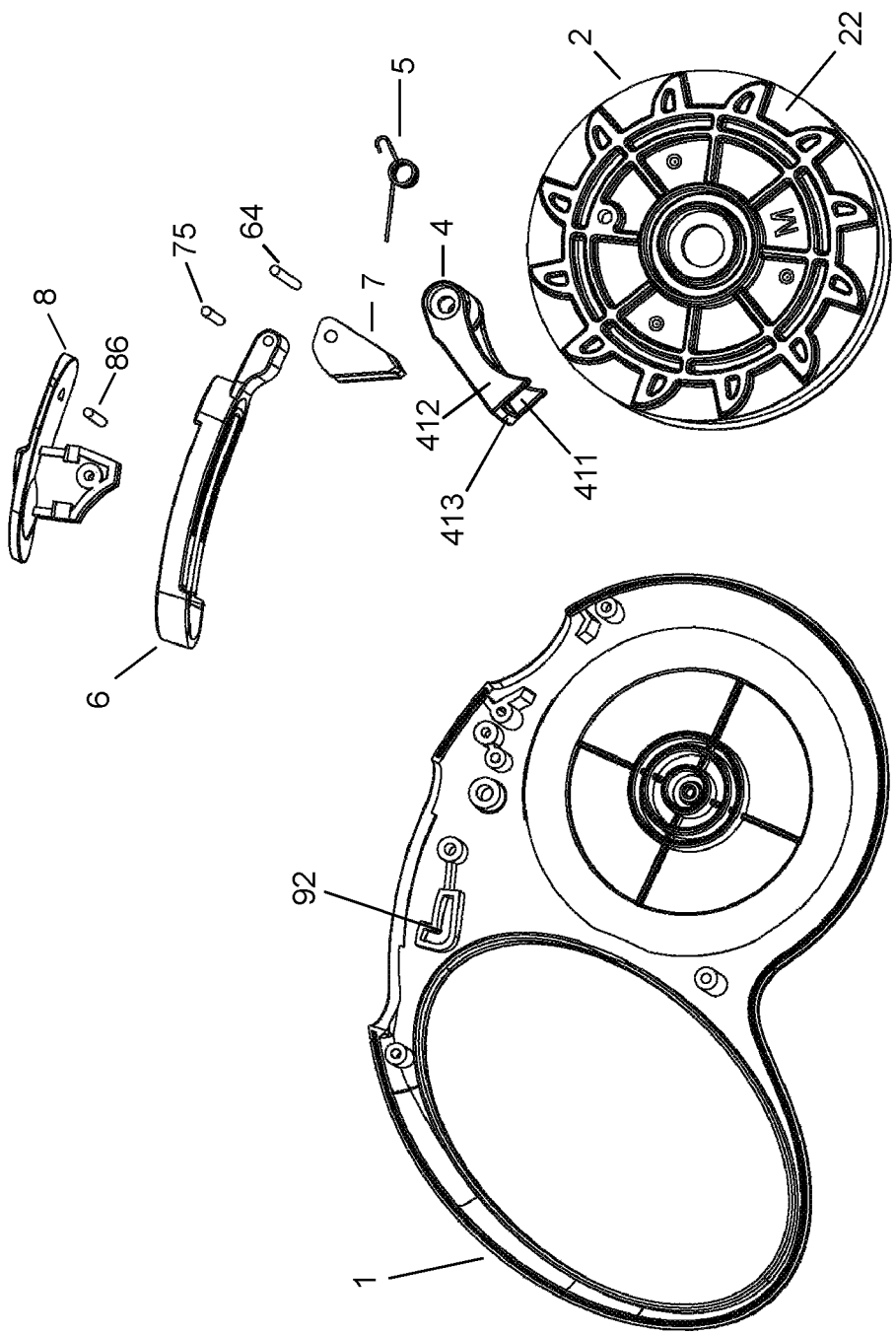
FIG. 2 is a second perspective disassembling view of the embodiment as shown in FIG. 1.
Figure 3:
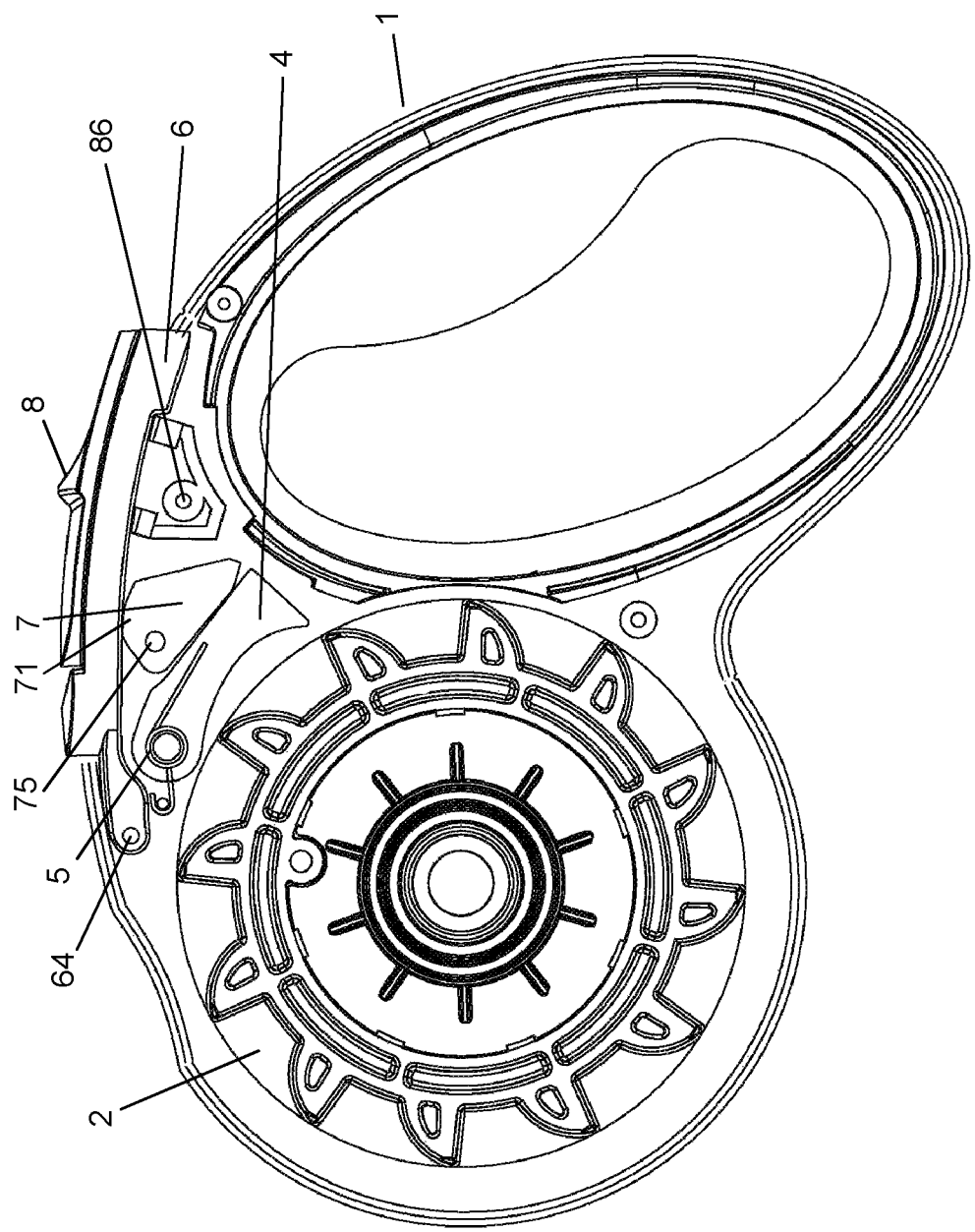
FIG. 3 is a schematic view illustrating the state when the locking means of the embodiment as shown in FIG. 1 is at the unlocking position.
Figure 4:
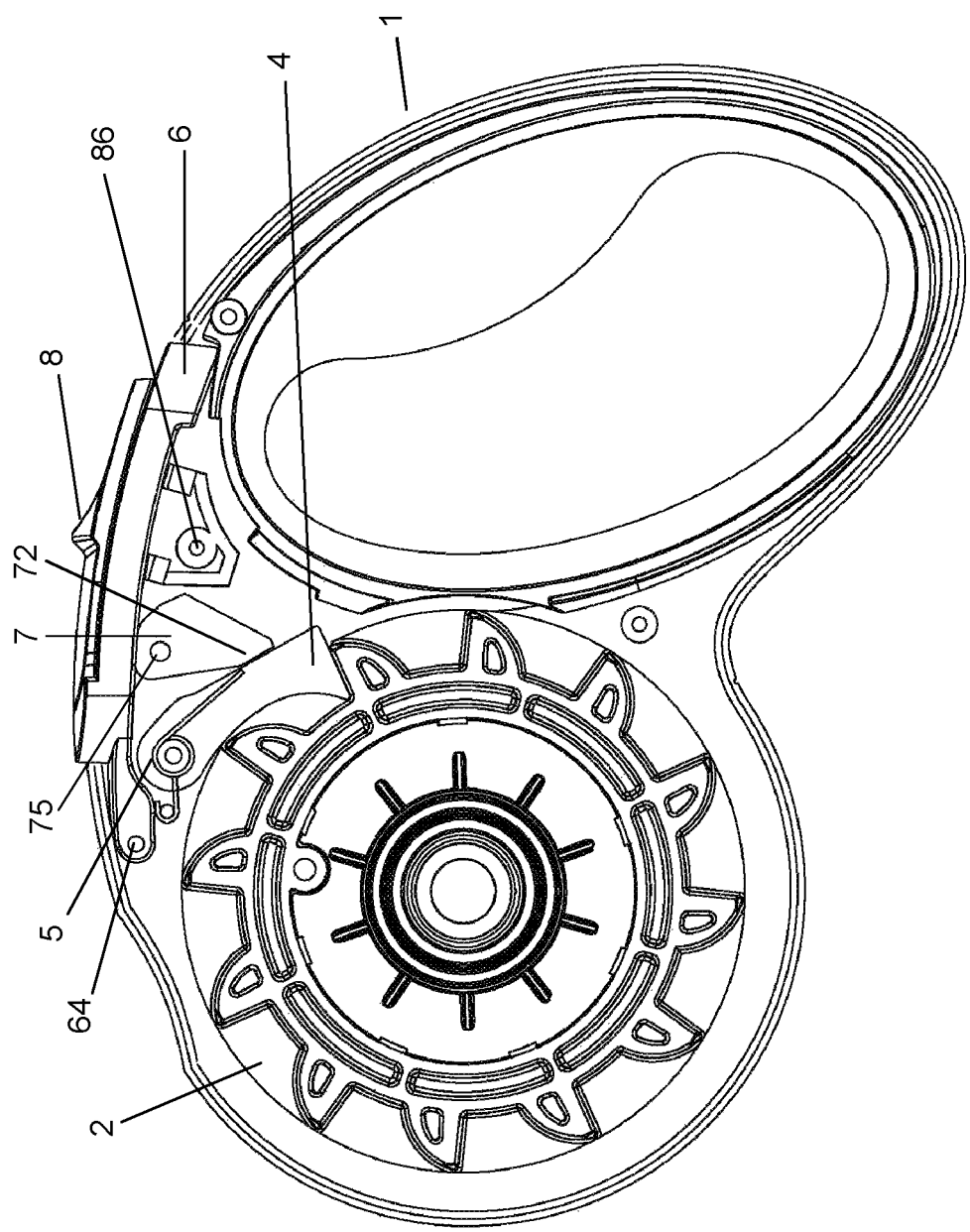
FIG. 4 is a schematic view illustrating the state when the locking means of the embodiment as shown in FIG. 1 is at the locking position.

As illustrated in FIGS. 1 to 4, the present embodiment comprises a housing 1, a spool 2, a braking means 3, a locking means 4, a biasing means 5, a press button 6, an actuating means 7 and a sliding button 8.

The spool 2 is disposed inside the housing 1 and rotatable in either an unwinding direction or a winding direction and is biased towards the winding direction in conventional manner known in the art. The braking means 3 is provided on the spool 2. In this embodiment, the breaking means 3 on the spool 2 is in form of ratchet teeth disposed at an outer perimeter of the spool 2. The spool 2 has a top side 21 and a bottom side 22 which are both disposed with identical ratchet teeth being the braking means 3 at outer perimeters thereof.

The locking means 4 is rotatable between a locking position where a first portion 41 of the locking means 4 engages with the spool 2 and cooperates with the ratchet teeth being the breaking means 3 to stop rotation of the spool 2 towards the unwinding direction and an unlocking position where the locking means 4 is disengaged from the spool 2 and the spool 2 is rotatable towards either the unwinding direction or the winding direction. In this embodiment, the first portion 41 of the locking means 4 is in form of a clamp with a top extension 411 and a bottom extension 412 connected by a vertical member 413. The top extension 411 and the bottom extension 412 are adapted to extend into the outer perimeter of the top side 21 and the bottom side 22 of the spool 2 respectively to cooperate with the ratchet teeth being the braking means 3 of the top side 21 and the bottom side 22 respectively at the locking position.

The biasing means 5 biases the locking means 4 towards the unlocking position. In this embodiment, the biasing means 5 is in form of a torsion spring with an end of a first leg 51 coupled to a rod fixed in the housing 1 and an end of a second leg 52 coupled to an inside of the locking means 4.

The press button 6 has an upper portion 61 exposing outside the housing 1 and is pivotable between a pressed position and a released position. More particularly, a first end 63 of the press button 6 is pivotally connected to a rod 64 fixed in the housing 1.

The actuating means 7 is rotatably engaged with the press button 6 and the locking means 4 between a default position and an actuating position. In this embodiment, the actuating means 7 has a cam shape having a first converging end 73 and a second converging end 74 along a lengthwise direction of the actuating means 7. The actuating means 7 is rotatable along a rod 75 passing through the first converging end 73. A first actuating portion 71 between the first converging end 73 and the second converging end 74 of the actuating means 7 abuts against a bottom portion 62 of the press button 6 at the default position to maintain the press button 6 at the released position. Pressing of the press button 6 from the released position to the pressed position rotates the actuating means 7 around the rod 75 from the default position to the actuating position where the locking means 4 is pushed by a second actuating portion 72 of the actuating means 7 to overcome biasing force of the torsion spring being the biasing means 5 to rotate to the locking position.

The sliding button 8 has an upper portion 81 exposing on the upper portion 61 of the press button 6 and a lower portion 82 extending downwards through the press button 6 into the housing 1. In this embodiment, the lower portion 82 has an acute-angled bottom end 821. A guiding member 86 in form of a rod passes through the bottom end 821.

The lower portion 82 of the sliding button 8 is configured to slide along an L-shaped sliding track 9 having a vertical portion 91 and a horizontal portion 92 in the housing 1 between a first position where the lower portion 82 of the sliding button 8 is disengaged from the actuating means 7 and a second position where the lower portion 82 of the sliding button 8 abuts against the first actuating portion 71 of the actuating means 7 to prevent rotation of the actuating means 7 and thereby maintaining the actuating means 7 at the actuating position.

In this embodiment, the sliding track 9 comprises a first L-shaped frame 93, a second L-shaped frame 94, and a gap (not shown in the drawings) between the first L-shaped frame 93 and the second frame L-shaped 94 for the lower portion 82 of the sliding button 8 to pass through. The rod being guiding member 86 passing through the bottom end 821 of the lower portion 82 of the sliding button 8 has a first end 861 which is configured to slide within the first L-shaped frame 93 and a second end 862 which is configured to slide within the second L-shaped frame 94.

To stop the leash, the user first the press button 6; pressing of the press button 6 causes rotation of the actuating means 7 from the default position to the actuating position where the second actuating portion 72 of the actuating means 7 overcomes the biasing force of the torsion spring being the biasing means 5 to push the locking means 4 from the unlocking position to the locking position, so that a first portion 41 of the locking means 4 engages with the spool 2 and cooperates with the ratchet teeth being the braking means 3 to stop rotation of the spool 2 towards the unwinding direction.

To lock the leash after stopping the leash, the user, while pressing the press button 6, slides the sliding button 8 forward from the first position to the second position. As the press button 6 is pressed, the bottom end 821 of the lower portion 82 of the sliding button 8 is also guided by the rod being the guiding member 86 to slide along the sliding track 9 from a top end of the vertical portion 91 to a bottom end of the vertical portion 91; sliding of the sliding button 8 forward from the first position to the second position causes the rod being the guiding member 86 and therefore the bottom end 821 of the lower portion 82 of the sliding button 8 to slide along the sliding track 9 from a first end of the horizontal portion 92 to a second end of the horizontal portion 92. When the bottom end 821 of the lower portion 82 of the sliding button 8 reaches the second end of the horizontal portion 92 of the sliding track 9, the bottom end 821 of the lower portion 82 of the sliding button 8 abuts against the first actuating portion 71 of the actuating means 7 to prevent rotation of the actuating means 7 so that the actuating means 7 is maintained at the actuating position. At this time, even if the user removes his hand from the press button 6, the press button 6 will remain at the pressed position. The user therefore does not need to press the press button 6 all the time to continue locking of the leash.

To unlock the leash, the user first slides the sliding button 8 backward from the second position to the first position and then releases the press button 6; sliding the sliding button 8 backward from the second position to the first position causes the bottom end 821 of the lower portion 82 of the sliding button 8 to slide from the second end of the horizontal portion 92 of the sliding track 9 to the first end of the horizontal portion 92 of the sliding track 9, thereby disengaging the bottom end 821 of the lower portion 82 of the sliding button 8 from the actuating means 7; as the press button 6 is released, the locking means 4 is biased by the torsion spring being the biasing means 5 to return from the locking position to the unlocking position, thereby also pushing the actuating means 7 to return from the actuating position to the default position, which is possible now as the bottom end 821 of the lower portion 82 of the sliding button 8 is disengaged from the actuating means 7. As the actuating means 7 returns to the default position, rotation of the actuating means 7 also pushes the press button 6 to return to the default position.

The above embodiment is a preferred embodiment of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A retractable leash with improved locking and unlocking mechanism comprising
   a housing;
   a spool disposed inside the housing and rotatable in either an unwinding direction or a winding direction and is biased towards the winding direction;
   a braking means provided on the spool;
   a locking means rotatable between a locking position where a first portion of the locking means engages with the spool and cooperates with the braking means to stop rotation of the spool towards the unwinding direction and an unlocking position where the locking means is disengaged from the spool and the spool is rotatable towards either the unwinding direction or the winding direction;
   a biasing means which biases the locking means towards the unlocking position;
   a press button with an upper portion thereof exposing outside the housing and pivotable between a pressed position and a released position;
   an actuating means rotatably engaged with the press button and the locking means between a default position and an actuating position; a first actuating portion of the actuating means abuts against a bottom portion of the press button at the default position to maintain the press button at the released position; pressing of the press button from the released position to the pressed position rotates the actuating means from the default position to the actuating position where the locking means is pushed by a second actuating portion of the actuating means to overcome biasing force of the biasing means to rotate to the locking position;
   a sliding button having an upper portion exposing on the upper portion of the press button and a lower portion extending downwards through the press button into the housing;
   the lower portion of the sliding button is configured to slide along an L-shaped sliding track having a vertical portion and a horizontal portion in the housing between a first position where the lower portion of the sliding button is disengaged from the actuating means and a second position where the lower portion of the sliding button abuts against the first actuating portion of the actuating means to prevent rotation of the actuating means and thereby maintaining the actuating means at the actuating position.

2. The retractable leash with improved locking and unlocking mechanism as in claim 1, wherein the braking means on the spool is in form of ratchet teeth disposed at an outer perimeter of the spool; the spool has a top side and a bottom side which are both disposed with identical ratchet teeth at outer perimeters thereof.

3. The retractable leash with improved locking and unlocking mechanism as in claim 1, wherein the first portion of the locking means is in form of a clamp with a top extension and a bottom extension connected by a vertical member; the top extension and the bottom extension are adapted to extend into the outer perimeter of the top side and the bottom side of the spool respectively to cooperate with the ratchet teeth of the top side and the bottom side respectively at the locking position.

4. The retractable leash with improved locking and unlocking mechanism as in claim 1, wherein the actuating means has a cam shape having a first converging end and a second converging end along a lengthwise direction of the actuating means; the actuating means is rotatable along a rod passing through the first converging end.

5. The retractable leash with improved locking and unlocking mechanism as in claim 1, wherein the biasing means is in form of a torsion spring with an end of a first leg coupled to a rod fixed in the housing and an end of a second leg coupled to an inside of the locking means.

6. The retractable leash with improved locking and unlocking mechanism as in claim 1, wherein a first end of the press button is pivotally connected to a rod fixed in the housing.

7. The retractable leash with improved locking and unlocking mechanism as in claim 1, wherein the lower portion of the sliding button extending downwards from the press button has an acute-angled bottom end; a guiding member passes through the bottom end.

8. The retractable leash with improved locking and unlocking mechanism as in claim 7, wherein the guiding member is in form of a rod.

9. The retractable leash with improved locking and unlocking mechanism as in claim 7, wherein the sliding track comprises a first L-shaped frame, a second L-shaped frame, and a gap between the first L-shaped frame and the second L-shaped frame for the lower portion of the sliding button to pass through; the guiding member passing through the bottom end of the lower portion of the sliding button has a first end which is configured to slide within the first L-shaped frame and a second end which is configured to slide within the second L-shaped frame.

* * * * *